(12) United States Patent
Ishizu et al.

(10) Patent No.: US 9,370,006 B2
(45) Date of Patent: Jun. 14, 2016

(54) INFORMATION TRANSMISSION DEVICE AND INFORMATION TRANSMISSION METHOD

(71) Applicant: NATIONAL INSTITUTE OF INFORMATION AND COMMUNICATIONS TECHNOLOGY, Koganei-shi, Tokyo (JP)

(72) Inventors: Kentaro Ishizu, Koganei (JP); Homare Murakami, Koganei (JP); Hiroshi Harada, Koganei (JP)

(73) Assignee: NATIONAL INSTITUTE OF INFORMATION AND COMMUNICATIONS TECHNOLOGY, Tokyo (JP)

( * ) Notice: Subject to any disclaimer, the term of this patent is extended or adjusted under 35 U.S.C. 154(b) by 64 days.

(21) Appl. No.: 14/379,981

(22) PCT Filed: Nov. 12, 2012

(86) PCT No.: PCT/JP2012/007228
§ 371 (c)(1),
(2) Date: Aug. 20, 2014

(87) PCT Pub. No.: WO2013/124931
PCT Pub. Date: Aug. 29, 2013

(65) Prior Publication Data
US 2015/0009969 A1 Jan. 8, 2015

(30) Foreign Application Priority Data
Feb. 24, 2012 (JP) ................... 2012-038709

(51) Int. Cl.
*H04W 72/04* (2009.01)
*H04W 16/14* (2009.01)
(Continued)

(52) U.S. Cl.
CPC .......... *H04W 72/0453* (2013.01); *H04L 5/0091* (2013.01); *H04W 16/14* (2013.01); *H04W 72/0446* (2013.01); *H04W 72/08* (2013.01); *H04L 27/0006* (2013.01)

(58) Field of Classification Search
CPC . H04W 72/0453; H04W 48/16; H04W 16/14; H04W 84/12; H04W 48/18
See application file for complete search history.

(56) References Cited

U.S. PATENT DOCUMENTS 8,483,155 B1 * 7/2013 Banerjea ............... H04W 16/14
370/329
8,611,939 B2 12/2013 Sagae et al.
(Continued)

FOREIGN PATENT DOCUMENTS

| CN | 102037757 A | 4/2011 |
| CN | 102197681 A | 9/2011 |

(Continued)

OTHER PUBLICATIONS

International Preliminary Report on Patentability (IPRP) including Written Opinion dated Sep. 4, 2014 in parent International Application No. PCT/JP2012/007228.
(Continued)

*Primary Examiner* — Jung-Jen Liu
(74) *Attorney, Agent, or Firm* — Holtz, Holtz & Volek PC

(57) ABSTRACT

Provided are an information transmission device and method thereof allowing a wireless device intended to newly start an operation in a white space to efficiently perform its preparatory operation, the transmission device including: a first retainer retaining first information including at least a list of channels available in each of first-type partial areas obtained when dividing an area at a first fineness; a second retainer retaining second information including at least a list of channels available in each of second-type partial areas obtained when dividing the area at a second fineness finer than the first fineness; a generator generating multiplexed information including the first and the second information so that the first and the second information are repeated at equal frequencies, or the first information is repeated at a frequency higher than that of the second information in the time axis direction; and a transmitter wirelessly transmitting the multiplexed information.

11 Claims, 7 Drawing Sheets

(51) Int. Cl.
*H04W 72/08* (2009.01)
*H04L 5/00* (2006.01)
*H04L 27/00* (2006.01)

(56) References Cited

U.S. PATENT DOCUMENTS

| | | | | |
|---|---|---|---|---|
| 2001/0007558 | A1* | 7/2001 | Kitazawa | H04N 7/165 370/390 |
| 2010/0197317 | A1* | 8/2010 | Sadek | H04W 72/082 455/452.2 |
| 2011/0130164 | A1 | 6/2011 | Sagae et al. | |
| 2011/0237179 | A1 | 9/2011 | Sagae et al. | |
| 2011/0244904 | A1 | 10/2011 | Sagae et al. | |
| 2012/0170534 | A1* | 7/2012 | Kim | H04H 20/42 370/329 |
| 2012/0184318 | A1* | 7/2012 | Lee | H04W 16/14 455/515 |
| 2013/0016221 | A1* | 1/2013 | Charbit | H04W 16/14 348/180 |

FOREIGN PATENT DOCUMENTS

| | | | |
|---|---|---|---|
| EP | 2282569 | A1 | 2/2011 |
| EP | 2323444 | A1 | 5/2011 |
| EP | 2323445 | A1 | 5/2011 |
| JP | 2010063034 | A | 3/2010 |
| WO | 2009142163 | A1 | 11/2009 |
| WO | 2010026857 | A1 | 3/2010 |
| WO | 2011118825 | A1 | 9/2011 |

OTHER PUBLICATIONS

International Search Report (ISR) dated Feb. 12, 2013 issued in International Application No. PCT/JP2012/007228.

Kentaro Ishizu, et al, "Design of spectrum sharing type cognitive radio system with out-band pilot channel", IEICE Technical Report, Mar. 2010, vol. 109, No. 442, pp. 37-44.

Kentaro Ishizu, et al, "Out-band pilot channel for notification of regulatory information and terminals' sharing of environmental information", IEICE Technical Report, May 2010, vol. 110, No. 41, pp. 57-64.

Kentaro Ishizu, et al, "Prototyping and Evaluation of Out-of-band Pilot Channel Mechanism for Spectrum Sharing Type Cognitive Radio System", IEICE Technical Report, Jan. 2011, vol. 110, No. 398, pp. 73-80.

Extended European Search Report dated Nov. 26, 2015, issued in counterpart European Application No. 12869536.8.

* cited by examiner

FIG. 3

| CH13 | 0 | 1 | 2 | 3 |
|---|---|---|---|---|
| 0 | AVAILABLE | AVAILABLE | AVAILABLE | AVAILABLE |
| 1 | AVAILABLE | AVAILABLE | NOT AVAILABLE | NOT AVAILABLE |
| 2 | AVAILABLE | NOT AVAILABLE | NOT AVAILABLE | NOT AVAILABLE |
| 3 | AVAILABLE | NOT AVAILABLE | NOT AVAILABLE | NOT AVAILABLE |

↓ PRIMARY USER PROTECTION REGION

→ PRIMARY USER PROTECTION REGION

V4

| CH | (0,0) | (0,1) | (0,2) | (0,3) | ... | (3,2) | (3,3) |
|---|---|---|---|---|---|---|---|
| 13 | AVAILABLE | AVAILABLE | AVAILABLE | AVAILABLE | : | NOT AVAILABLE | NOT AVAILABLE |
| 14 | : | : | : | : | : | : | : |
| 15 | : | : | : | : | : | : | : |
| 51 | : | : | : | : | : | : | : |

FIG. 5

V REGION

| CH | HOKKAIDO | TOHOKU | KANTO | CHUBU | ... |
|---|---|---|---|---|---|
| 13 | AVAILABLE | NOT AVAILABLE | NOT AVAILABLE | NOT AVAILABLE | ... |
| 14 | : | : | : | : | : |
| 15 | : | : | : | : | : |
| : | : | : | : | : | : |
| 51 | : | : | : | : | : |

V PREFECTURE

| CH | ... | SAITAMA | CHIBA | TOKYO | KANAGAWA | ... |
|---|---|---|---|---|---|---|
| 13 | ... | NOT AVAILABLE | NOT AVAILABLE | NOT AVAILABLE | NOT AVAILABLE | ... |
| 14 | : | : | : | : | : | : |
| 15 | : | : | : | : | : | : |
| : | : | : | : | : | : | : |
| 51 | : | : | : | : | : | : |

V MUNICIPALITY

| CH | ... | YOKOHAMA | ATSUGI | HIRATSUKA | YOKOSUKA | ... |
|---|---|---|---|---|---|---|
| 13 | ... | AVAILABLE | NOT AVAILABLE | NOT AVAILABLE | NOT AVAILABLE | ... |
| 14 | : | : | : | : | : | : |
| 15 | : | : | : | : | : | : |
| : | : | : | : | : | : | : |
| 51 | : | : | : | : | : | : |

FIG. 6A

| E2 | E2 | E2 | E2 | E2 | E2 | E2 | E2 | E2 | E2 |
|----|----|----|----|----|----|----|----|----|----|
| V4 | | | V4 | | | V4 | | | V4 |

FIG. 6B

| E2 | E2 | E2 | E2 | E2 | E2 | E2 | E2 | E2 | E2 |
|----|----|----|----|----|----|----|----|----|----|
| E4 | | | | E4 | | | | E4 | |

FIG. 6C

| E2 | E2 | E2 | E2 | E2 | E2 | E2 | E2 | E2 | E2 |
|----|----|----|----|----|----|----|----|----|----|
| E4 | | | | E4 | | | | E4 | |

INFORMATION TRANSMISSION DEVICE AND INFORMATION TRANSMISSION METHOD

TECHNICAL FIELD

The present invention relates to transmitting information wirelessly, and particularly relates to an information transmission device and an information transmission method assisting a wireless device intended to newly start an operation in a white space, to perform its preparatory operation.

BACKGROUND ART

Wireless communication standards whose communication use a frequency band same as that of a television broadcast being a licensed business and can be operated with no such a license, have been investigated. In these standards, a television broadcaster is a primary user, and only when a licensed frequency band of the primary user is not used, a secondary user is allowed to operate a wireless communication in the frequency band (licensed frequency band which is not used=TV white space; TVWS).

Wireless devices (an access point device and a terminal, for example) used under this environment find, when a power supply thereof is turned on, all of available frequency bands (channels) with no TV signals existed therein through sensing, and start an operation in any of the available frequency bands, for example. It can be considered that such the sensing requires an enormous amount of time since a frequency band to be a target of sensing is very wide.

Therefore, it can be considered that an information transmission station which keeps transmitting information of available channels all the time, as a broadcast, is provided and operated. Thereby, each of the wireless devices only can receive the information, and can be released from an enormous amount of burden such as the sensing. Meanwhile, since an amount of information transmitted by such an information transmission station is considered to be very large, it can be considered that the information transmission station preferably performs efficient information transmission which is easy to use for the wireless devices.

PRIOR ART DOCUMENT

Non-Patent Document

Non-Patent Document 1: Kentaro Ishizu, and four others, "Design of spectrum sharing type cognitive radio system with out-band pilot channel", The Institute of Electronics, Information and Communication Engineers, Technical Committee on Software Radio, March, 2010, vol. 109, No. 442, pages 37 to 44

Non-Patent Document 2: Kentaro Ishizu, and three others, "Out-band pilot channel for notification of regulatory information and terminals' sharing of environmental information", The Institute of Electronics, Information and Communication Engineers, Technical Committee on Software Radio, May, 2010, vol. 110, No. 41, pages 57 to 64

Non-Patent Document 3: Kentaro Ishizu, and two others, "Prototyping and evaluation of out-band pilot channel mechanism for spectrum sharing type cognitive radio system", The Institute of Electronics, Information and Communication Engineers, Technical Committee on Software Radio, January, 2011, vol. 110, No. 398, SR2010-81, pages 73 to 80

SUMMARY OF THE INVENTION

Problems to be Solved by the Invention

The present invention has an object to provide an information transmission device and an information transmission method capable of allowing a wireless device intended to newly start an operation in a white space to efficiently perform its preparatory operation.

Means for Solving the Problems

In order to solve the above-described problems, an information transmission device being one aspect of the present invention includes: a first retainer configured to retain first information including at least a list of channels available in each of first-type partial areas obtained when dividing an area at a first fineness being a predetermined fineness; a second retainer configured to retain second information including at least a list of channels available in each of second-type partial areas obtained when dividing the area at a second fineness finer than the first fineness; a generator configured to generate multiplexed information including the first information and the second information so that the first information and the second information are repeated at equal frequencies in a time axis direction, or the first information is repeated at a frequency higher than that of the second information in the time axis direction; and a transmitter configured to wirelessly transmit the multiplexed information.

Namely, the information transmitted from this information transmission device results from multiplexing the information of channels available in each of the partial areas which are geographical divisions in a coarse manner, and the information of channels available in each of the partial areas which are geographical divisions in a manner finer than the above case. Further, the former is set to be repeatedly transmitted at a frequency same as or higher than that of the latter. The former has relatively small amount of information, and the latter has relatively large amount of information.

A wireless device after receiving the information from this information transmission device can first obtain, based on its positional information, the information of available channels in comparison with the former information. This only requires simple processing which takes a short period of time. Even in a case where the former information does not indicate an available channel, since there is a possibility that the indication is made, with a margin, regarding the partial areas which are geographical divisions in a coarse manner, the side of the wireless device can further obtain the information of available channels in comparison with the latter information as needed. This requires processing which relatively takes a long time and which is relatively not simple, but, the processing is not always conducted. As a whole, the wireless device can efficiently perform its preparatory operation.

Further, an information transmission method being another aspect of the present invention includes: retaining first information including at least a list of channels available in each of first-type partial areas obtained when dividing an area at a first fineness being a predetermined fineness; retaining second information including at least a list of channels available in each of second-type partial areas obtained when dividing the area at a second fineness finer than the first fineness; generating multiplexed information including the first information and the second information so that the first information and the second information are repeated at equal frequencies in a time axis direction, or the first information is repeated at a frequency higher than that of the second information in the time axis direction; and wirelessly transmitting the multiplexed information.

This information transmission method is a method capable of being performed by corresponding to the configuration of the above-described information transmission device.

Effect of the Invention

According to the present invention, it is possible to provide an information transmission device and an information transmission method capable of allowing a wireless device intended to newly start an operation in a white space to efficiently perform its preparatory operation.

BRIEF DESCRIPTION OF THE DRAWINGS

FIG. 3 is an explanatory diagram illustrating a configuration example of information retained by the information retaining unit 11 illustrated in FIG. 1, in addition to the configuration example of information illustrated in FIG. 2.

FIG. 5 is an explanatory diagram illustrating a configuration example of information retained by the information retaining unit 11 illustrated in FIG. 1, which is different from the configuration example of information illustrated in FIG. 2 and FIG. 3.

FIG. 6A is an explanatory diagram illustrating one example of form of multiplexing performed by the multiplexed information generating unit 12 illustrated in FIG. 1, which is different from the examples of form of multiplexing illustrated in FIGS. 4A, 4B, and 4C.

FIG. 6B is an explanatory diagram illustrating another example of form of multiplexing performed by the multiplexed information generating unit 12 illustrated in FIG. 1, which is different from the examples of form of multiplexing illustrated in FIGS. 4A, 4B, and 4C.

FIG. 6C is an explanatory diagram illustrating still another example of form of multiplexing performed by the multiplexed information generating unit 12 illustrated in FIG. 1, which is different from the examples of form of multiplexing illustrated in FIGS. 4A, 4B, and 4C.

MODES FOR CARRYING OUT THE INVENTION

Figure 1:
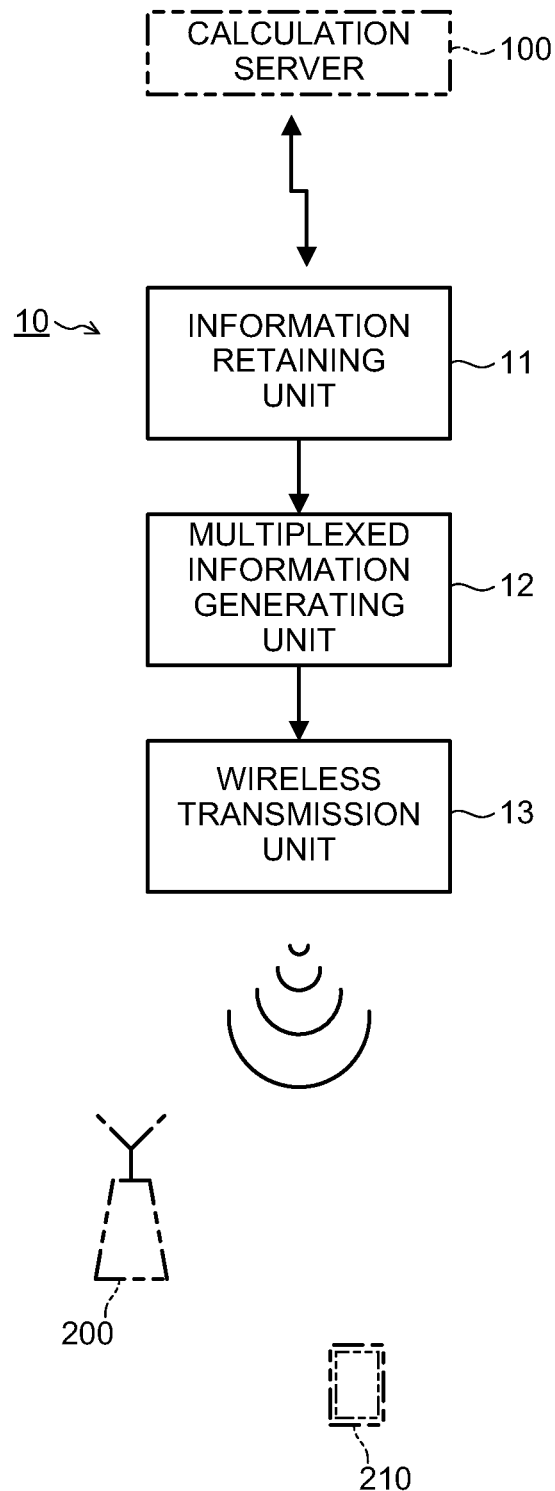
FIG. 1 is a functional block diagram illustrating a configuration of an information transmission device being one embodiment of the present invention.

As a mode of an embodiment of the present invention, it is possible to set such that the first retainer treats each mesh obtained when dividing the area into meshes as each of the first-type partial areas to retain the first information, and the second retainer treats each mesh obtained when dividing the area into meshes finer than the meshes in the first retainer as each of the second-type partial areas to retain the second information.

To divide the area into meshes and set each mesh to each of the partial areas, is one way for dividing the area, and the way is plain with no missing in the dividing of the area. As the meshes, it can be considered to employ, other than normal meshes with a shape of square or rectangle, for example, triangular meshes or hexagonal meshes capable of being laid and arranged on a plane. The meshes can be regarded to have a geometric shape, so that generally, it is easy to understand a relationship related to a size thereof. Therefore, a relationship regarding the amounts of information in the above-described first information and second information, also becomes a relationship which is easy to understand. For example, if square meshes arranged by dividing the area into n by n pieces are employed, there is provided a relationship in which an amount of information of the entire area is in proportion to $n^2$. This makes it easy to design multiplexing, in the multiplexing of the first information and the second information.

Further, as a mode, it is possible to set such that each of the first information and the second information is information further including, in addition to the list of channels available, usage regulations in each of channels of the list of channels available. Each of the first information and the second information includes the list of available channels at the minimum, and other than the list, various pieces of information may be included in each of the first information and the second information as needed, at a level at which a burden does not become too big as the information transmission device. If, as one of the various pieces of information, information related to the usage regulations such as, for example, information regarding an available maximum transmission power and/or available time zone is included, a more careful service can be provided.

Further, as a mode, it is possible to set such that the first retainer treats each of partial areas obtained when dividing the area based on administrative divisions as each of the first-type partial areas to retain the first information, and the second retainer treats each of partial areas obtained when dividing the area based on administrative divisions finer than the administrative divisions in the first retainer to retain the second information.

To divide the area based on administrative divisions and set the resultant to each of the partial areas, is another way for dividing the area, and the way is plane with no missing in the dividing of the area. This can be considered to contribute to a consistency with an administration that regulates radio waves such as airwaves as well.

Further, as a mode, it is possible to set such that the generator generates the multiplexed information by performing time division multiplexing, frequency division multiplexing, or code division multiplexing on the first information and the second information. For the generation of multiplexed information, conceivable multiplexing methods can be employed, and, for example, the time division multiplexing, the frequency division multiplexing, and the code division multiplexing are respectively typical multiplexing methods.

Further, as a mode, it is possible to set such that a first encoder configured to encode the first information retained by the first retainer so that the first information has a redundancy, to generate first encoded information having a first code amount, and a second encoder configured to encode the second information retained by the second retainer so that the second information have a redundancy, to generate second encoded information having a second code amount equal to the first code amount, are further provided, and the generator generates the multiplexed information by multiplexing the first encoded information and the second encoded information so that the first encoded information and the second encoded information are repeated at equal frequencies in the time axis direction.

It is also possible to treat the first information and the second information by converting these into encoded information so as to have a redundancy. If the information after being encoded is transmitted, it is possible to perform, on the receiving side, error detection and correction by utilizing the redundancy. From a point of view such that the information is accurately transmitted from the transmitting side to the receiving side, it can also be considered to attain good results when the information is transmitted after being encoded as above, even if a number of repetitions is sacrificed. Note that the reason why the second encoded information and the first encoded information are set to be repeated at equal frequencies in the time axis direction, is because each of the encoded information has the equal code amount, and when the code amounts are made to be even as above, it can be considered that an easy design becomes possible from a point of view of a unit of transmission, and further, a handling on a transmission system also becomes easy.

Based on the above description, embodiments of the present invention will be described hereinafter while referring to the drawings. FIG. 1 is a functional block diagram illustrating a configuration of an information transmission device being one embodiment of the present invention. As illustrated in FIG. 1, the information transmission device 10 has an information retaining unit 11, a multiplexed information generating unit 12, and a wireless transmission unit 13.

A channel (frequency band) transmitted by the information transmission device 10 is referred to as a cognitive pilot channel (CPC), hereinafter. The CPC exists for assisting wireless devices such as an access point device 200 and its terminal 210 intended to newly start an operation in a white space, to perform their preparatory operation such as a selection of frequency band (channel). The CPC is assumed to be kept transmitted all the time as a pilot channel, like a 24-hour broadcasting.

Further, it is presupposed that, in order to obtain information required for the information transmission, the information transmission device 10 can access a calculation server 100. For the communication between the information transmission device 10 and the calculation server 100, a communication network including the Internet can be utilized, for example.

The wireless devices (the access point device 200 and its terminal 210) after obtaining the information by the CPC perform their position identification by utilizing GPS, for example, and compare a result of the position identification with the information obtained by the CPC, resulting in that they can select an available channel for them.

The information retaining unit 11 retains information (first information) including at least a list of channels available in each of partial areas obtained when dividing an area at a predetermined fineness. Further, the information retaining unit 11 also retains information (second information) including at least a list of channels available in each of partial areas obtained when dividing the above-described area at a fineness finer than the above-described fineness. Here, "available" means that the channels are available as a secondary user. These sets of information are supplied from the calculation server 100 toward the information transmission device 10.

The calculation server 100 is provided in view of a possibility in which a channel available in each of the partial areas temporally changes.

Figure 2:
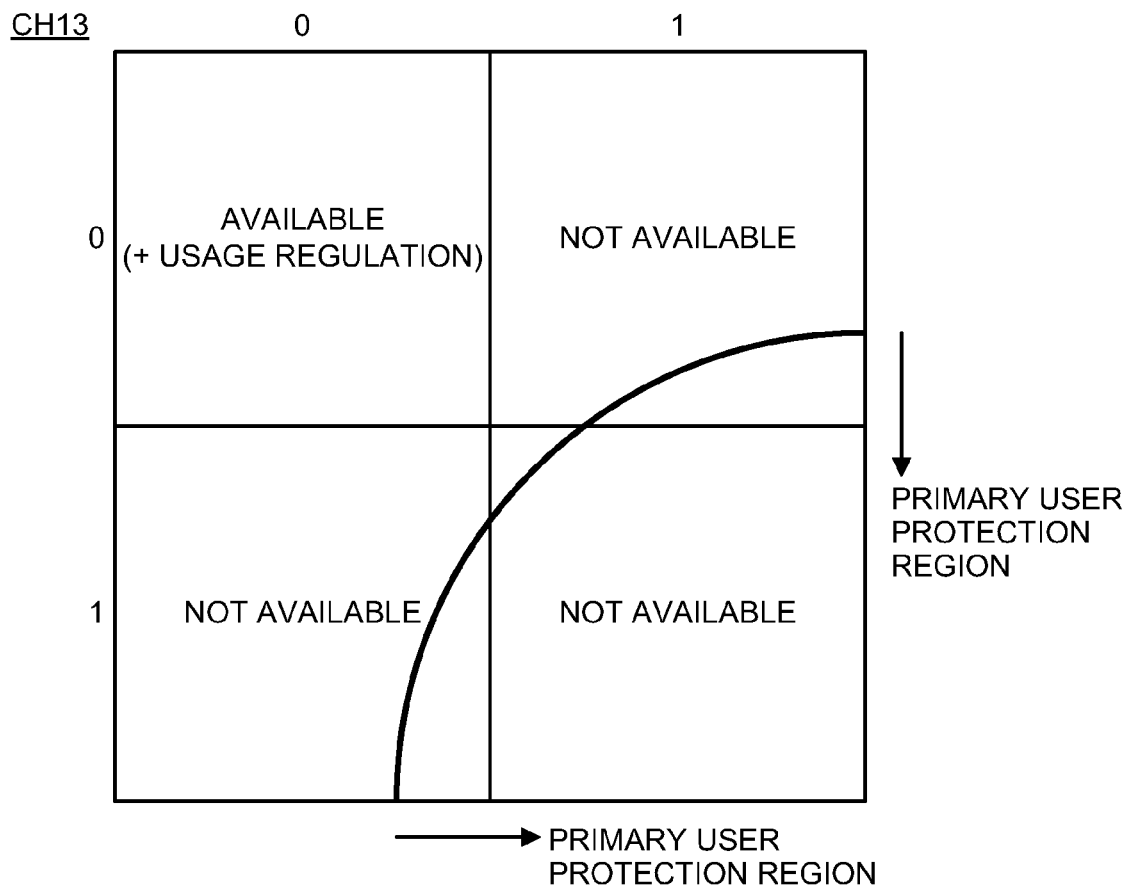
FIG. 2 is an explanatory diagram illustrating a configuration example of information retained by an information retaining unit 11 illustrated in FIG. 1.

The above-described first information and second information will be described by citing examples while referring to FIG. 2 and FIG. 3. Each of FIG. 2 and FIG. 3 is an explanatory diagram illustrating a configuration example of information retained by the information retaining unit 11 illustrated in FIG. 1. FIG. 2 explains first information including a list of channels available in each of partial areas (square meshes, in this case) obtained when dividing an area at a predetermined fineness. FIG. 3 explains second information including a list of channels available in each of partial areas (finer square meshes) obtained when dividing this area at a finer fineness.

As illustrated in FIG. 2, the first information includes whether a particular channel CH13 is available in each of partial areas obtained when dividing an area at a fineness of 2×2, for example. As illustrated in the drawing, if the partial area exists in a manner that even a part thereof is overlapped with a primary user protection region, it is specified, with a margin, that the particular channel CH13 is not available in that partial area. Further, the first information has similar information regarding each of all channels capable of being targets of selection, with a configuration similar to that of CH13. Hereinafter, the first information is represented by "V2", on the ground that it is information related to the case of dividing the area at the fineness of 2×2.

Further, as illustrated in FIG. 3, the second information includes whether the particular channel CH13 is available in each of partial areas obtained when dividing the same area as that of the above description at a fineness of 4×4, for example. As illustrated in the drawing, if the partial area exists in a manner that even a part thereof is overlapped with the primary user protection region, it is specified, with a margin, that the particular channel CH13 is not available in that partial area. Further, the second information has similar information regarding each of all channels capable of being targets of selection, with a configuration similar to that of CH13. The second information is represented by "V4", based on the above-described definition. Generally, an amount of information of Vn is in proportion to $n^2$.

The wireless devices (the access point device 200 and its terminal 210) utilizing the CPC specify their positions by utilizing GPS, for example, thereby determining that they are positioned on which mesh indicated in FIG. 2 (in FIG. 3, depending on cases) obtained by the CPC.

Returning to the description referring to FIG. 1, the first information and the second information retained by the information retaining unit 11 are supplied to the multiplexed information generating unit 12. The multiplexed information generating unit 12 generates multiplexed information by multiplexing the first information and the second information so that the first information and the second information are repeated at equal frequencies in a time axis direction, or the first information is repeated at a frequency higher than that of the second information in the time axis direction.

Figure 4A:
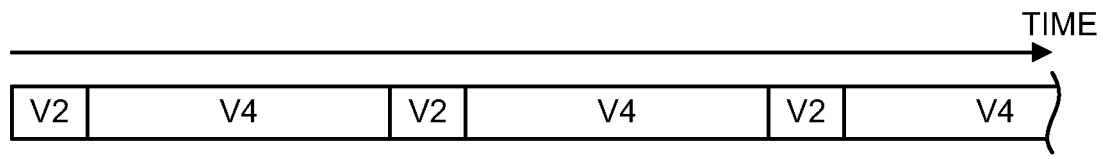
FIG. 4A is an explanatory diagram illustrating one example of form of multiplexing performed by a multiplexed information generating unit 12 illustrated in FIG. 1.
Figure 4B:
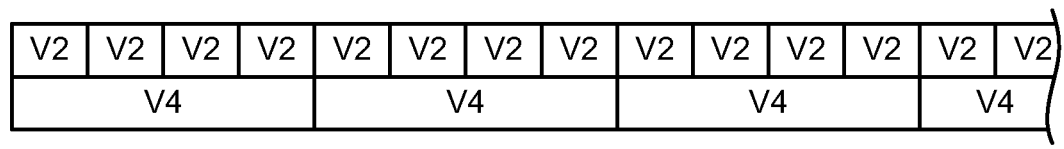
FIG. 4B is an explanatory diagram illustrating another example of form of multiplexing performed by the multiplexed information generating unit 12 illustrated in FIG. 1.
Figure 4C:
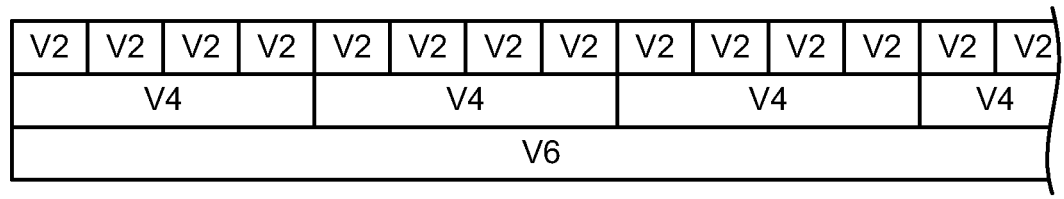
FIG. 4C is an explanatory diagram illustrating still another example of form of multiplexing performed by the multiplexed information generating unit 12 illustrated in FIG. 1.

A function performed by the multiplexed information generating unit 12 will be described by citing a case of "V2" as the first information and "V4" as the second information as described in FIG. 2 and FIG. 3 as an example, while referring to FIGS. 4A, 4B, and 4C. FIGS. 4A, 4B, and 4C are explanatory diagrams each illustrating an example of form of multiplexing performed by the multiplexed information generating unit 12 illustrated in FIG. 1.

FIG. 4A illustrates a case where multiplexed information is obtained by multiplexing V2 and V4 so that V2 and V4 are temporally and alternately repeated. In this case, V2 and V4 are repeated at equal frequencies in the time axis direction, in which V2 has an amount of information being ¼ of an amount of information of V4, which is reflected also in the time direction. Accordingly, a wireless device after receiving the multiplexed information can complete the reception of V2 in a period of time shorter than a period of time required for the reception of V4 in most cases, so that the wireless device can quickly obtain the information of available channels in comparison with V2. When appropriate available channels cannot be found in comparison with V2, it is set that the information of available channels is further obtained in comparison with V4.

FIG. 4B illustrates a case were repetitive signals of V2 and repetitive signals of V4 are multiplexed in layers. For the multiplexing in this case, well-known multiplexing methods such as time division multiplexing, frequency division multiplexing, and code division multiplexing can be employed. It is conceivable that the cases of the frequency division multiplexing and the code division multiplexing can be sufficiently understood through illustrations. In the case of the time division multiplexing, for example, a sequence of V2 and a first quarter of V4, V2 and a second quarter of V4, V2 and a third quarter of V4, and V2 and a fourth quarter of V4, is set to one group, and the sequence is only required to be repeated. Alternatively, it is also possible to set such that both of V2 and V4 are broken down into information segments having finer and the same amount of information, and the V2 information segment and the V4 information segment are repeated.

Also in the case illustrated in FIG. 4B, a wireless device after receiving the multiplexed information can complete the reception of V2 in a period of time shorter than a period of time required for the reception of V4, so that the wireless device can quickly obtain the information of available channels in comparison with V2, which is the same as the case illustrated in FIG. 4A. When appropriate available channels cannot be found in comparison with V2, it is set that the information of available channels is further obtained in comparison with V4.

Note that FIG. 4C illustrates a case where V2, V4, and V6 as well, are multiplexed in layers. The method of multiplexing is similar to that in the explanation in FIG. 4B. When the multiplexing is performed as above, a wireless device after receiving the multiplexed information can quickly obtain the information of available channels in comparison with V2, and when it cannot find appropriate available channels in comparison with V2, next, it is set to obtain the information of available channels in comparison with V4. Further, it is possible to set such that if the wireless device cannot find appropriate available channels in comparison with V4, the information of available channels is obtained in comparison with V6.

It goes without saying that the multiplexing as illustrated in FIG. 4C can be further generalized, and Vn (namely, third information, fourth information, and subsequent sets of information) can be further multiplexed.

Returning to the explanation referring to FIG. 1, the multiplexed information generated by the multiplexed information generating unit 12 is supplied to the wireless transmission unit 13. The wireless transmission unit 13 wirelessly transmits the supplied multiplexed information as the CPC. The wireless devices (the access point device 200 and its terminal 210) after obtaining the information by the CPC perform their position identification by utilizing GPS, for example, and compare a result of the position identification with the information obtained by the CPC, resulting in that they can select an available channel for them.

As described above, according to the present embodiment, the following operation and effect are exhibited. Namely, the information transmitted from this information transmission device 10 results from multiplexing the information of channels available in each of the partial areas which are geographical divisions in a coarse manner, and the information of channels available in each of the partial areas which are geographical divisions in a manner finer than the above case. Further, the former is set to be repeatedly transmitted at a frequency same as or higher than that of the latter. The former has relatively small amount of information, and the latter has relatively large amount of information.

Wireless devices (the access point device 200 and its terminal 210) after receiving the information from this information transmission device 10 can first obtain, based on their positional information, the information of available channels in comparison with the former information. This only requires simple processing which takes a short period of time. Even in a case where the former information does not indicate an available channel, since there is a possibility that the indication is made, with a margin, regarding the partial areas which are geographical divisions in a coarse manner, the side of the wireless device can further obtain the information of available channels in comparison with the latter information as needed. This requires processing which relatively takes a long time and which is relatively not simple, but, the processing is not always conducted. As a whole, the wireless devices can efficiently perform their preparatory operation.

Note that to divide a geographical area into meshes and set each mesh to each of the partial areas, is one way for dividing the area, and the way is plain with no missing in the dividing of the area. As the meshes, it can be considered to employ, other than normal meshes with a shape of square or rectangle, for example, triangular meshes or hexagonal meshes capable of being laid and arranged on a plane. The meshes can be regarded to have a geometric shape, so that generally, it is easy to understand a relationship related to a size thereof. Therefore, a relationship regarding the amounts of information in the above-described first information, second information, and subsequent pieces of information also becomes a relationship which is easy to understand. This makes it easy to design multiplexing, in the multiplexing of the first information, second information, and subsequent sets of information.

Further, it is also possible to set such that each of the first information, second information, and subsequent pieces of information is information including, in addition to the list of available channels, usage regulations regarding each of the available channels. This is performed as needed, at a level at which a burden does not become too big as the information transmission device 10. If, as one of the usage regulations, information regarding an available maximum transmission power and/or available time zone is included, a more careful service can be provided.

Then, another configuration example of information retained by the information retaining unit 11 will be described while referring to FIG. 5. FIG. 5 is an explanatory diagram illustrating a configuration example of information retained by the information retaining unit 11 illustrated in FIG. 1, which is different from the configuration example of information illustrated in FIG. 2 and FIG. 3.

In this example, it is set such that each of the partial areas obtained when dividing the area based on administrative divisions is treated as a partial area that is a unit in which information of available channels is indicated, instead of treating each of the meshes that is a result of dividing the area into meshes as a partial area that is a unit in which the information of available channels is indicated.

An example thereof corresponds to, for example, respective sets of information of "V region" obtained through the coarsest division, "V prefecture" obtained through the second coarsest division, and "V municipality" obtained through a finer division, as illustrated in FIG. 5. It is possible to set that information units (=partial areas) of the "V region" are about 10 units, for example, information units of the "V prefecture" are about 50 units, for example, and information units of the "V municipality" are about 500 units, for example.

Even in a case where such information is retained by the information retaining unit 11, the multiplexed information generating unit 12 and the wireless transmission unit 13 performing subsequent processing can be set based on the already-made description. To divide an area based on administrative divisions and set the resultant to each of partial areas, is another way for dividing the area, and the way is plain with no missing in the dividing of the area. This can be considered to contribute to a consistency with an administration that regulates radio waves such as airwaves as well.

When the information transmission device 10 transmitting the information with the configuration as illustrated in FIG. 5 is operated, the wireless devices (the access point device 200 and its terminal 210) after obtaining the information by the CPC first perform their position identification utilizing GPS, for example, and compare a result of the position identification with the information obtained by the CPC, and in that case, they have to previously know that their positions (namely, latitudes and longitudes of the positions) correspond to which partial area. Regarding this, it is possible to employ a method such that a correspondence table between the latitudes and longitudes, and the partial areas, is previously prepared, for example.

Then, FIGS. 6A, 6B, and 6C are explanatory diagrams each illustrating an example of form of multiplexing performed by the multiplexed information generating unit 12 illustrated in FIG. 1, which is different from the example of form of multiplexing illustrated in FIGS. 4A, 4B, and 4C.

In FIGS. 6, "En" indicates information as a result of encoding (applying redundancy) to Vn. Generally, when encoding is performed, the encoded information has a certain code amount, resulting in that apparent information is increased (a length of information becomes long in the time direction). However, since the redundancy is applied, it is possible to perform error detection and correction on the receiving side. The generation of the encoded information as above and the generation of multiplexed information are conducted in the multiplexed information generating unit 12. The information retained by the information retaining unit 11 can also be treated by being converted into the encoded information set to have the redundancy as described above. From a point of view such that the information is accurately transmitted from the transmitting side to the receiving side, it can also be considered to attain good results when the information is transmitted after being encoded as above, even if a number of repetitions is sacrificed.

FIG. 6A is a modified example of the form illustrated in FIG. 4B, and illustrates a form in which only V2 with small amount of information, out of V2 and V4, is encoded and multiplexed as E2. It can be considered that the wireless devices (the access point device 200 and its terminal 210) after receiving the multiplexed information are highly likely to refer to only E2, without referring to V4, so that if V2 is set to E2 to increase a noise resistance, a form of providing information with high reliability is realized in many cases.

As a matter of course, it is also possible that both of V2 and V4 are encoded to be E2 and E4, as illustrated in FIG. 6B. The case illustrated in FIG. 6B illustrates a case where common encoding is performed on both of V2 and V4, and in this case, a same magnification relationship in the time direction is maintained even after the encoding, in accordance with the original amounts of information of V2 and V4. Note that it is needless to say that encoding with a method and/or a redundancy different between V2 and V4 can also be performed. In that case, generally, a relationship of timings of E2 and E4 does not become a synchronous relationship in the time direction as illustrated in the drawing.

FIG. 6C illustrates a form in which particularly timings of E2 and E4 are deviated in the case of FIG. 6B. As this, there is no particular limitation in the timings of E2 and E4, and even if it is designed as this, the obtainable effect is the same as that in the case of FIG. 6B.

Figure 7:
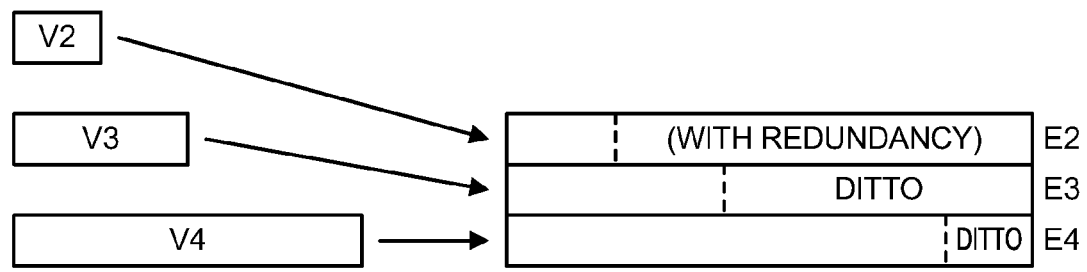
FIG. 7 is an explanatory diagram illustrating an example of form of multiplexing performed by the multiplexed information generating unit 12 illustrated in FIG. 1, which is different from the examples of form of multiplexing illustrated in FIGS. 4A, 4B, and 4C, and FIGS. 6A, 6B, and 6C.

Then, FIG. 7 is an explanatory diagram illustrating an example of form of multiplexing performed by the multiplexed information generating unit 12 illustrated in FIG. 1, which is different from the example of form of multiplexing illustrated in FIGS. 4A, 4B, and 4C, and FIGS. 6A, 6B, and 6C.

This illustrates a case where respective sets of information V2, V3, and V4 retained by the information retaining unit 11 are encoded to have redundancy to generate sets of encoded information (E2, E3, and E4) each having the same fixed code amount, and accordingly, these sets of encoded information are multiplexed so as to be repeated at equal frequencies in the time axis direction. The generation of encoded information and the generation of multiplexed information as above are performed by the multiplexed information generating unit 12, and when the multiplexed information is supplied to the wireless transmission unit 13, the information is wirelessly transmitted as the CPC.

When each of the respective sets of encoded information is set to have the equal code amount as illustrated in FIG. 7, it is easy to perform the multiplexing so that the respective sets of encoded information are repeated at equal frequencies in the time axis direction. Specifically, if the code amounts are made to be even as above, it can be considered that an easy design becomes possible from a point of view of a unit of transmission, and further, a handling as a transmission system required in the information transmission device 10 also becomes easy.

The embodiments have been described above, and in the above description, the information transmission is set to be performed by utilizing the CPC. A method of operation other than the above can also be considered. For example, if it is designed such that the wireless devices (the access point device 200 and its terminal 210) first utilize, when a power supply thereof is turned on, the CPC for obtaining information, after a communication of secondary user in an available channel is started thereafter, a similar provision of information can be conducted through a normal IP communication by setting a server on the Internet as a transmission source. The wireless devices (the access point device 200 and its terminal 210) can constantly keep searching available channels by utilizing the information.

Hereinabove, while certain embodiments have been described, these embodiments have been presented by way of example only, and are not intended to limit the scope of the inventions. Indeed, the novel embodiment described herein may be embodiment in a variety of other forms; furthermore, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information transmission device, comprising:
a first retainer configured to retain first information including at least a list of channels available in each of a plurality of first-type partial areas, wherein the plurality of first-type partial areas are partial areas obtained when dividing a certain area at a first fineness which is equal to a predetermined fineness;
a second retainer configured to retain second information including at least a list of channels available in each of a plurality of second-type partial areas, wherein the plurality of second-type partial areas are partial areas obtained when dividing the same certain area at a second fineness that is finer than the first fineness;
a first encoder configured to encode the first information retained by the first retainer so that the first information has a redundancy, so as to generate first encoded information having a first code amount;
a second encoder configured to encode the second information retained by the second retainer so that the second information has a redundancy, so as to generate second encoded information having a second code amount which is equal to the first code amount;
a generator configured to generate multiplexed information including the first encoded information and the second encoded information so that the first encoded information and the second encoded information are repeated at equal frequencies in a time axis direction; and
a transmitter configured to wirelessly transmit the multiplexed information.

2. The information transmission device according to claim 1, wherein the first retainer treats each mesh obtained when dividing the certain area into meshes as said each of the plurality of first-type partial areas; and
wherein the second retainer treats each mesh obtained when dividing said certain area into meshes finer than the meshes obtained by the first retainer as said each of the plurality of second-type partial areas.

3. The information transmission device according to claim 1, wherein each of the first information and the second information further includes, in addition to the list of channels available, usage regulations in each channel of the list of channels available.

4. The information transmission device according to claim 1, wherein the first retainer treats each of partial areas obtained when dividing the certain area based on administrative divisions as said each of the plurality of first-type partial areas; and
wherein the second retainer treats each of partial areas obtained when dividing said certain area based on administrative divisions finer than the administrative divisions in the first retainer as said each of the plurality of second-type partial areas.

5. An information transmission method, comprising:
retaining first information including at least a list of channels available in each of a plurality of first-type partial areas, wherein the plurality of first-type partial areas are partial areas obtained when dividing a certain area at a first fineness that is equal to a predetermined fineness;
retaining second information including at least a list of channels available in each of a plurality of second-type partial areas, wherein the plurality of second-type partial areas are partial areas obtained when dividing the same certain area at a second fineness that is finer than the first fineness;
encoding the first information so that the first information has a redundancy, and so as to generate first encoded information having a first code amount;
encoding the second information so that the second information has a redundancy, and so as to generate second encoded information having a second code amount equal to the first code amount;
generating multiplexed information including the first encoded information and the second encoded information so that the first encoded information and the second encoded information are repeated at equal frequencies in a time axis direction; and
wirelessly transmitting the multiplexed information.

6. An information transmission device, comprising:
a first retainer configured to retain first information including at least a list of channels available in each of a plurality of first-type partial areas, wherein the plurality of first-type partial areas are partial areas obtained when dividing a certain area at a first fineness that is equal to a predetermined fineness;
a second retainer configured to retain second information including at least a list of channels available in each of a plurality of second-type partial areas, wherein the plurality of second-type partial areas are partial areas obtained when dividing the same certain area at a second fineness that is finer than the first fineness;
a first encoder configured to encode the first information retained by the first retainer so that the first information has a redundancy, so as to generate first encoded information having a first code amount;
a generator configured to generate multiplexed information including the first encoded information and the second information so that the first encoded information is repeated at a frequency higher than that of the second information in a time axis direction; and
a transmitter configured to wirelessly transmit the multiplexed information.

7. The information transmission device according to claim 6, further comprising:
a second encoder configured to encode the second information retained by the second retainer so that the second information has a redundancy, so as to generate second encoded information having a second code amount,
wherein the multiplexed information includes the first encoded information and the second encoded information, wherein the first encoded information is repeated at a frequency higher than that of the second encoded information in the time axis direction.

8. The information transmission decide according to claim 6, wherein the first retainer treats each mesh obtained when dividing the certain area into meshes as said each of the plurality of first-type partial areas; and
wherein the second retainer treats each mesh obtained when dividing said certain area into meshes finer than the meshes obtained by the first retainer as said each of the plurality of second-type partial areas.

9. The information transmission device according to claim 6, wherein each of the first information and the second information further includes, in addition to the list of channels available, usage regulations in each channel of the list of channels available.

10. The information transmission device according to claim 6, wherein the first retainer treats each of partial areas obtained when dividing the certain area based on administrative divisions as said each of the plurality of first-type partial areas; and wherein the second retainer treats each of partial areas obtained when dividing said certain area based on administrative divisions finer than the administrative divisions in the first retainer as said each of the plurality of second-type partial areas.

11. An information transmission method, comprising:

retaining first information including at least a list of channels available in each of a plurality of first-type partial areas, wherein the plurality of first-type partial areas are partial areas obtained when dividing a certain area at a first fineness that is equal to a predetermined fineness;

retaining second information including at least a list of channels available in each of a plurality of second-type partial areas, wherein the plurality of second-type partial areas are partial areas obtained when dividing the same certain area at a second fineness that is finer than the first fineness;

encoding the first information so that the first information has a redundancy, and so as to generate first encoded information having a first code amount;

generating multiplexed information including the first encoded information and the second information so that the first encoded information is repeated at a frequency higher than that of the second information in a time axis direction; and wirelessly transmitting the multiplexed information.

* * * * *